United States Patent [19]

Eibl

[11] 4,316,730

[45] Feb. 23, 1982

[54] FILTER FOR THE REMOVAL OF APOLAR ORGANIC SUBSTANCES FROM GASES

[75] Inventor: Hansjörg Eibl, Bovenden, Fed. Rep. of Germany

[73] Assignee: Max Planck-Gesellschaft, Gottingen, Fed. Rep. of Germany

[21] Appl. No.: 173,947

[22] Filed: Jul. 31, 1980

Related U.S. Application Data

[63] Continuation of Ser. No. 926,173, Jul. 19, 1978, abandoned.

[30] Foreign Application Priority Data

Apr. 27, 1978 [DE] Fed. Rep. of Germany ....... 2818608

[51] Int. Cl.³ .............................................. B01D 39/14
[52] U.S. Cl. ..................................... 55/524; 260/403; 252/426; 131/203; 131/207
[58] Field of Search ................... 55/524; 131/202, 203, 131/207, 261 R, 261 B; 426/622; 260/403; 252/426

[56] References Cited

U.S. PATENT DOCUMENTS

| | | | |
|---|---|---|---|
| 1,606,052 | 11/1926 | Bollmann | 426/662 |
| 2,186,709 | 1/1940 | Rowland | 252/427 |
| 2,366,190 | 1/1945 | Hurn | 252/427 |
| 3,246,654 | 4/1966 | Stahly | 131/10.9 |
| 3,344,796 | 10/1967 | Yamaji et al. | 131/261 R |
| 3,464,423 | 9/1969 | Klein | 131/261 R |
| 3,513,644 | 5/1970 | Weil | 55/524 |
| 3,708,869 | 1/1973 | Anderson | 260/403 |
| 3,875,196 | 4/1975 | Miguro et al. | 260/403 |

FOREIGN PATENT DOCUMENTS 2530107 1/1977 Fed. Rep. of Germany ........ 55/524

*Primary Examiner*—Bernard Nozick
*Attorney, Agent, or Firm*—Sprung, Felfe, Horn, Lynch & Kramer

[57] ABSTRACT

Filter for the removal of apolar organic substances from gases containing an absorbent comprising at least one compound of the following formula:

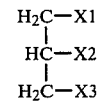

wherein one of X1, X2, and X3 is a phosphoric acid, phosphoric acid ester, or phosphatidyl moiety and two of the groups X1, X2, and X3 are independently selected from saturated fatty acid ester moieties and saturated alcohol (8 to 20 carbon atoms) ether moieties.

20 Claims, No Drawings

FILTER FOR THE REMOVAL OF APOLAR ORGANIC SUBSTANCES FROM GASES

This is a continuation, of application Ser. No. 926,173, filed July 19, 1978 now abandoned.

The invention relates to a filter for the removal of apolar organic substances from gases, especially from air.

The removal of apolar organic substances from gases, in connection with industrial processes, for example, or from tobacco smoke, is difficult, since two properties are required which are difficult to reconcile with one another: on the one hand, the filter should offer the least possible resistance to the passage of a gas, that is, it should have a strong, open structure, but on the other hand, it should have a very high absorptive capacity for the apolar organic substances.

Hitherto attempts have been made to solve this problem essentially by modifying solid, organic substances physically or chemically so as to provide them with a very large adsorptive and organophilic surface.

The object of the invention is to provide a filter having both of the above-mentioned properties to an extent unachieved hitherto.

The filter of the invention for the removal of apolar organic substances from gases contains as an absorbent at least one compound of general formula:

$$\begin{array}{c} H_2C-X1 \\ | \\ HC-X2 \\ | \\ H_2C-X3 \end{array}$$

wherein one of the groups X1, X2 or X3 is a phosphoric acid moiety, a phosphoric acid ester moiety or a phosphatidyl moiety, and two of the groups X1, X2 and X3 are, independently of one another, an ester moiety of a saturated fatty acid or an ether moiety of a saturated alcohol of 8 to 20 carbon atoms.

Preferably, the compound of General Formula I contains a phosphoric acid moiety or phosphoric acid ester moiety of General Formula II:

$$-O-\underset{\underset{O}{\|}}{\overset{\overset{O}{\|}}{P}}-O-(CH_2)_n-N\overset{R}{\underset{R''}{\diagdown}}R' \qquad II$$

in which R, R' and R" each represent a hydrogen atom or an alkyl moiety of 1 to 4 carbon atoms and n represents the number 2 to 16, or of General Formula III:

$$-O-Y \qquad III$$

in which Y represents the moiety of a bivalent, trivalent or more polyvalent $C_{2-7}$ alcohol, or of General Formula IV:

$$-O-Z \qquad IV$$

in which Z represents a $C_{1-20}$ alkyl moiety.

The compounds of General Formula I are characterized by the fact that they are capable of forming thin surface films which have an extraordinarily great absorptivity for apolar organic substances. These compounds have low phase transition temperatures (solid-liquid phase transition), and this is especially advantageous, since the absorptivity in the liquid state is much higher than in the solid phase. Therefore, those compounds of General Formula I or those mixtures are used whose phase transformation temperature is lower than the anticipated working temperature of the filter. Preferred are those compounds or mixtures which have a phase transformation temperature of 80° C. or less, and, with special preference, of 20° C. or less, if the removal of apolar organic substances from air, especially from tobacco smoke, is involved.

The filter of the invention can contain a single compound of General Formula I or a mixture of several such compounds. The use of a mixture is preferred, because then the performance of this absorbent can be most easily adapted to the particular purpose.

The absorption performance and the phase transformation temperature are determined mainly by the length of the fatty acid ester groups and by their symmetry or lack of symmetry. The term symmetry, as used herein, is to be interpreted as meaning that the molecule contains two identical fatty acid groups. Such compounds of General Formula I containing two identical fatty acid ester groups have definitely higher phase transformation temperatures for the number of carbon atoms they contain than compounds of General Formula I having no symmetry, i.e., containing two different fatty acid ester groups, even if the sum of the carbon atoms in these groups is just as great as it is in a symmetrical compound.

A second factor which affects the phase transformation temperature is the position of the fatty acid ester groups. If they are adjacent, this temperature is higher than it is if they are in a 1,3 relationship.

This is especially important when the filter of the invention is to be used as a tobacco filter, e.g., as a cigaret filter. The filter is then preferably operated above the phase transformation temperature. In the case of symmetrical compounds of General Formula I, of the lecithin type, that is, those phosphatidyl esters which have a moiety of General Formula II in which R=R'=R"=methyl and n=2, the phase transformation temperature is 54° for the distearoyl compound, 41° C. for the dipalmitoyl compound, 23° C. for the dimyristoyl compound, and 0° C. for the dilauroyl compound. In the case of the lauroyl-palmitoyl compound, on the other hand, which has a twelve carbon chain and a sixteen carbon chain in the same molecule, the phase transformation temperature is less than $-10°$ C., i.e., more than 33° C. lower than it is in the case of the dimyristoyl compound which is the same in its number of carbon atoms. It is therefore easy for any particular case to select the compound or mixture of compounds of General Formula I such that under all working conditions the temperature will be above the phase transformation temperature.

The compounds of Formula I are not oxidizable, in contrast, for example, to egg lecithin, which would easily be oxidized by the oxygen of the air to form toxic compounds. In this respect the absorbent compounds used in the filter of the invention differ from the widely used phospholipids, which contain mostly unsaturated fatty acid moieties and therefore are oxidizable. The same compounds occur in the human body and especially in lung tissue, where they act as surface active substances and, on account of their easy phase transformation at body temperature, play an important part in the expansion and contraction of the air cells. This is attributed to the presence of extended plateaus in the surface pressure-surface isotherms of these compounds.

The affinity between the absorbent compounds used in the filter of the invention and the alveolar wetting agents of the lung represents a special advantage in the use of the filters for tobacco smoke, since the compounds are absolutely non-toxic and very stable against the oxygen of the air. Therefore, if pieces of the filter material enter into the oral cavity, which can never be entirely prevented, especially in the case of cigaret filters, or even into the stomach and intestinal tract, this will do absolutely no harm to the smoker in any case.

Another advantage in this kind of application of the filter of the invention is to be seen in the fact that precisely those apolar organic substances are preferentially absorbed which otherwise accumulate in lung tissue, since they can also be absorbed in that tissue.

In contrast to the situation in the lung, however, the absorbent or absorbent mixture in the filter of the invention must not be selected such that the filter will operate in the boundary area of the phase transformation, but above it. Otherwise, however, it is unimportant within the scope of the invention, as far as effectiveness is concerned, whether the absorbent compounds of Formula I are in the form of lecithins, cephalins, phosphatidyl-glycerine derivatives or phosphatidyl alkyl esters. The lecithins and phosphatidyl compounds, however, differ from compounds of the cephalin type in their greater hygroscopicity, and they are therefore used preferentially within the scope of the invention when a certain moisture content is to be maintained in the filter. Moreover, they facilitate the preparation of homogeneous suspensions in water.

Since the absorbent compounds are to be present in the filter of the invention preferably in the liquid state and in this state a support is necessary, those filters are preferred which contain a suitable support. Any appropriate granular, particulate, foliar or comparably structured material will serve as support, which has sufficiently low resistance to the passage of the gases to be filtered and has sufficiently great absorbency or absorptive capacity for the phospholipid absorbents.

Examples of suitable supports are cigaret filter papers or filter papers generally, other cellulose derivatives of high absorbency, cotton wool, glass fiber wools, especially if they have organophilically modified surfaces, asbestos, mineral supports, and the like. It is thus possible to impregnate conventional cigaret filters with the phospholipids of General Formula I. Generally about 0.1 to 10 mg, preferably 0.3 to 5 mg, of compound of General Formula I is used in each cigaret filter, although larger or smaller amounts can also be used.

On the other hand, in filters for the removal of apolar organic substances from industrial exhausts, such as those from lacquers and printing inks, it may be desirable to have a very high working temperature. In this case, symmetrical compounds will be selected which have a high phase transformation temperature, adapted to the exhaust gas temperatures actually present.

Within the scope of the invention it is also possible to build up the filter in layers, each layer being impregnated with different phospholipids or phospholipid mixtures of gradated phase transformation temperature. In this manner a selective filtering action can be achieved. In this embodiment, the arrangement of the layers is preferably such that the layer nearest to the gases to be filtered is impregnated with the absorbent of highest phase transformation temperature, and then the following layers contain absorbents of diminishing phase transformation temperature.

The filters of the invention are also very well suited for the removal of undesired odors which are produced by apolar organic compounds; for example, they can be used advantageously as kitchen range filters or the like.

Experiments performed with cigaret filters of the invention have shown that the smoking sensation is not substantially affected by these filters. Apparently, minimal amounts of nicotine suffice to stimulate the taste receptors, so that on the one hand smoking pleasure is preserved, while on the other hand the lung is affected by only extremely small residues of harmful smoke components.

EXAMPLES

The following examples will further explain the invention:

EXAMPLES 1 TO 6

Conventional cigaret filters containing absorbent filter papers were impregnated with various mixtures of compounds of General Formula I.

The composition of the mixtures is given in the following Table I.

TABLE I

| Compound I Wt.-% | 1 | 2 | 3 | 4 | 5 | 6 |
|---|---|---|---|---|---|---|
| Dipalmitoyl-lecithin | 80 | 90 | 70 | 60 | 50 | 60 |
| Dipalmitoyl-N,N-dimethyl-cephalin | 15 | — | — | — | — | 10 |
| Dipalmitoyl-cephalin | 5 | 10 | 10 | 10 | 10 | 10 |
| Dipalmitoyl-phosphatidyl-glycerin | — | — | 20 | 30 | 40 | 20 |

EXAMPLE 7

To demonstrate the technical effect achieved by the filter of the invention in its use as a cigaret filter, the following comparative experiment was performed:

Conventional filter cigarets (Reemtsma's "Ernte 23") were equipped with a filter of the invention and then compared with the same, but untreated filter cigarets, with regard to the condensable substances contained in the smoke.

The filter of the invention was prepared as follows:

1.8 mg of 1,2-dimyristoyl-sn-glycerin-3-phosphoricacidglycerinester and 35.6 mg of 1,2-dimyristoyl-sn-glycerin-3-phosphoricacidcholinester were mixed with 10 ml of water and then let stand for 30 minutes at 55° C. Then the swollen mixture was emulsified in a blender, yielding about 10 ml of emulsion. The filter end of a filter cigaret was immersed to a depth of about 2 mm into the emulsion thus obtained. Within about 10 to 20 seconds the filter had absorbed the emulsion all the way to its upper end. Then the filter was allowed to dry in air at 20° C. for 24 hours. Approximately 0.2 ml of the emulsion had been absorbed by each cigaret. The content of dimyristoyl-glycerinphosphoricacid-glycerin ester per filter was therefore approximately 0.035 mg, and the dimyristoyl-glycerinphosphoricacid-cholinester content was about 0.7 mg.

The cigaret equipped with the filter of the invention was smoked in a smoking device in which a vacuum sufficient for the uniform burning of the cigaret was applied to the burning cigaret. The condensable substances that had passed into the smoke were frozen out in liquid air and the condensate thus obtained was then absorbed in 10 ml of methanol. The methanolic solution was examined spectroscopically. The measured extinction with the filter of the invention averaged 0.575 for three cigarets.

The corresponding standard value for three untreated cigarets was $\epsilon=0.957$. The measurement was performed at 450 nm in each case.

The values obtained show that, with the filter of the invention, about half of the substances passing through the commercial filter and absorbing at the stated wavelength had been removed. Both nicotine and the aromatic tar substances absorb at the stat wavelength.

It will be understood that the specification and examples are illustrative but not limitative of the present invention and that other embodiments within the spirit and scope of the invention will suggest themselves to those skilled in the art.

What is claimed is:

1. Filter for the removal of apolar organic substances from gases comprising a filter support and an absorbent comprising at least one compound of the following formula:

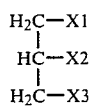   I wherein one of X1, X2, and X3 is a phosphoric acid, phosphoric acid ester, or phosphatidyl moiety and two of the groups X1, X2, and X3 are independently selected from saturated fatty acid ester moieties and saturated alcohol (8 to 20 carbon atoms) ether moieties.

2. Filter as claimed in claim 1, wherein one of X1, X2 and X3 is a phosphoric acid moiety.

3. Filter as claimed in claim 1, wherein one of X1, X2 and X3 is a phosphoric acid ester moiety of the following structure:

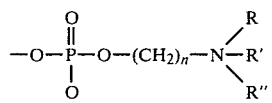   II wherein R, R' and R'' each represent a hydrogen atom or an alkyl moiety of 1 to 4 carbon atoms and n represents an integer from 2 to 16.

4. Filter as claimed in claim 1, wherein one of X1, X2 and X3 is a phosphoric acid ester moiety of the following structure:

   III wherein Y represents the moiety of a bivalent trivalent or more polyvalent alcohol from 2–7 carbon atoms.

5. Filter as claimed in claim 1, wherein one of X1, X2 and X3 is a phosphoric acid ester moiety of the following structure:

   IV in which Z is an alkyl moiety of 1–20 carbon atoms.

6. Filter as claimed in claim 1, wherein one of X1, X2 and X3 is a phosphatidyl moiety.

7. Filter as claimed in claim 1, wherein two of X1, X2 and X3 represent a saturated fatty acid ester moiety of 8–20 carbon atoms.

8. Filter as claimed in claim 1, wherein one of X1, X2 and X3 is an ether moiety of a saturated alcohol of from 8–20 carbon atoms.

9. Filter as claimed in claim 1, wherein said compound has a phase transformation temperature of 20° C. or less.

10. Filter as claimed in claim 1, wherein the compound of formula I contains two different fatty acid moieties.

11. Filter as claimed in claim 1, wherein the compound of formula I contains two different alkyl ether moieties.

12. Filter as claimed in claim 1, wherein said filter comprises cigarette filter paper impregnated with said absorbent.

13. Cigarette filter comprising a filter as claimed in claim 1.

14. Filter as claimed in claim 1, wherein the absorbent comprises a mixture of compounds responding to formula I.

15. Filter as claimed in claim 14, wherein the compounds of formula I contain two identical fatty acid ester groups.

16. Filter as claimed in claim 14, wherein the compounds of formula I contain two identical alkyl ether groups.

17. Filter as claimed in claim 1, comprising one or more members of the group consisting of dipalmitoyl lecithin, dipalmitoyl-N,N-dimethyl-cephalin, dipalmitoyl-cephalin, and dipalmitoyl-phosphatidyl glycerin.

18. Filter as claimed in claim 1, comprising at least one member of the group consisting of 1,2-dimyristoyl-sn-glycerin-3-phosphoric-acid-glycerinester, and 1,2-dimyristoyl-sn-glycerin-3-phosphoric-acid-cholinester.

19. Filter as claimed in claim 1 comprising at least one of
distearoyl lecithin,
dimyristoryl lecithin,
lauroyl-palmitoyl-lecithin and
dilauroyl-lecithin.

20. Filter for the removal of apolar organic substances from gases containing an absorbent, in solid form, comprising a filter support and an absorbent comprising at least one compound of the following formula:

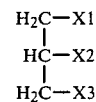

wherein one of X1, X2, and X3 is a phosphoric acid, phosphoric acid ester or phosphatidyl moiety and two of the groups X1, X2, and X3 are independently selected from saturated fatty acid ester moieties and saturated alcohol (8 to 20 carbon atoms) ether moieties.

* * * * *